(12) United States Patent
Betran Palomas et al.

(10) Patent No.: US 10,451,037 B2
(45) Date of Patent: Oct. 22, 2019

(54) WIND TURBINE BLADE

(71) Applicant: Alstom Renewable Technologies, Grenoble (FR)

(72) Inventors: Jaume Betran Palomas, Catalonia (ES); Arturo Rodriguez-Tsouroukdissian, Richmond, VA (US)

(73) Assignee: GE RENEWABLE TECHNOLOGIES WIND B.V., Breda (NL)

( * ) Notice: Subject to any disclaimer, the term of this patent is extended or adjusted under 35 U.S.C. 154(b) by 590 days.

(21) Appl. No.: 15/031,968

(22) PCT Filed: Oct. 23, 2014

(86) PCT No.: PCT/EP2014/072765
§ 371 (c)(1),
(2) Date: Apr. 25, 2016

(87) PCT Pub. No.: WO2015/059231
PCT Pub. Date: Apr. 30, 2015

(65) Prior Publication Data
US 2016/0273517 A1    Sep. 22, 2016

(30) Foreign Application Priority Data
Oct. 24, 2013    (EP) .................................... 13382426

(51) Int. Cl.
*F03D 7/02*        (2006.01)
*F03D 1/06*        (2006.01)

(52) U.S. Cl.
CPC ......... *F03D 7/0236* (2013.01); *F03D 1/0683* (2013.01); *F03D 7/022* (2013.01);
(Continued)

(58) Field of Classification Search
CPC ............ F05B 2270/404; F05B 2240/31; F05B 2240/311; F05B 2250/02; F05B 2260/507;
(Continued)

(56) References Cited

U.S. PATENT DOCUMENTS

2012/0068469 A1* 3/2012 Behrens ................ F03D 1/0641
290/55
2012/0151913 A1* 6/2012 Foshansky ............ F16K 31/003
60/527

FOREIGN PATENT DOCUMENTS

DE          10312971 A1   12/2004
DE       102010028490 A1   11/2011
(Continued)

OTHER PUBLICATIONS

A. D. Norman et. al., "Multistable corrugated shells", Jul. 8, 2008, Royal Society Publishing, vol. 464 Issue 2095, pp. 1-3.*
(Continued)

*Primary Examiner* — Justin D Seabe
*Assistant Examiner* — Justin A Pruitt
(74) *Attorney, Agent, or Firm* — Dority & Manning, P.A.

(57) ABSTRACT

Wind turbine blades comprising one or more deformable trailing edge sections, each deformable trailing edge section comprising a first and a second actuator, wherein the second actuator is arranged substantially downstream from the first actuator, and wherein the first actuator is of a first type and wherein the second actuator is of a second type, the second type being different from the first type. The application further relates to wind turbines comprising such blades and methods of operating a wind turbine comprising one or more of such blades.

13 Claims, 1 Drawing Sheet

(52) U.S. Cl.
CPC ........ *F03D 7/0232* (2013.01); *F05B 2240/31* (2013.01); *F05B 2240/311* (2013.01); *F05B 2250/02* (2013.01); *F05B 2260/507* (2013.01); *F05B 2270/331* (2013.01); *F05B 2270/602* (2013.01); *F05B 2270/604* (2013.01); *F05B 2270/605* (2013.01); *F05B 2270/606* (2013.01); *F05B 2280/6012* (2013.01); *Y02E 10/721* (2013.01); *Y02E 10/723* (2013.01)

(58) Field of Classification Search
CPC ............ F05B 2260/50; F05B 2270/331; F05B 2270/602; F05B 2270/604; F05B 2270/605; F05B 2270/606; F05B 2270/701; F05B 2280/6012; F03D 7/0236; F03D 7/024; F03D 7/0232; F03D 7/022; F03D 1/0683
USPC .......................................................... 416/1
See application file for complete search history.

(56) References Cited

FOREIGN PATENT DOCUMENTS

| EP | 2394911 A1 | 12/2011 |
|---|---|---|
| WO | 03082671 A1 | 10/2003 |
| WO | 2004088130 A1 | 10/2004 |

OTHER PUBLICATIONS

Clive Barnes, "Shape Memory and Superelastic Alloys", Jul. 1999, Copper Development Association Inc., p. 4 Par 2.*

PCT Search Report and Written Opinion issued in connection with corresponding PCT Application No. PCT/EP2014/072766 dated Nov. 13, 2014.

* cited by examiner

WIND TURBINE BLADE

CROSS-REFERENCE TO RELATED APPLICATIONS

This application is a national stage application under 35 U.S.C. § 371(c) of prior filed, co-pending PCT application serial number PCT/EP2014/072765, filed on Oct. 23, 2014 which claims priority to European Patent Application No. 13382426.8, titled "WIND TURBINE BLADE", filed on Oct. 24, 2013. The above-listed applications are herein incorporated by reference.

BACKGROUND

Embodiments of the present invention relate to wind turbine blades comprising one or more deformable trailing edge sections and wind turbines comprising such blades. It further relates to methods of operating a wind turbine comprising one or more of such wind turbine blades.

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

Pitch systems are normally employed for adapting the position of the blades to varying wind conditions. In this respect, it is known in wind speeds above a nominal wind speed to rotate the position of each blade along its longitudinal axis in such a way that lift and drag are changed to reduce torque. This way, even though the wind speed increases, the torque transmitted by the rotor to the generator remains substantially the same. Using pitch systems may be particularly suitable for adapting the wind turbine blade to a varying wind speed. However, the control of the pitch systems is usually based on determining and adjusting a rotational speed of the rotor, which is taken as an indirect measure of the average wind speed. This method may be rather slow to react due to the inertia of the system and may not be suitable to react to a sudden wind gust or other rapidly changing wind conditions.

Some other known systems change the aerodynamics of a wind turbine blade by further providing the blade with a trailing edge flap hinged to a main body. However, deflecting the aerodynamic surface about a hinged point may lead to flow separation which may cause abrupt aerodynamic changes, thus decreasing load and reducing efficiency of the wind turbine.

Document WO2004/088130 describes the control of aerodynamic forces substantially instantaneously and locally along the blades of a wind turbine rotor by continuous variation of the aerofoil geometry in the leading edge region and trailing edge region along part or the whole blade span. It further describes the use of smart materials or mechanical actuators integrated in a deformable material changing the outer geometry in the leading and trailing edge region and thereby changing the blade section aerodynamic forces. However, energy consumption in these systems can be relatively high.

BRIEF DESCRIPTION

It is an object of the present disclosure to provide an improved blade allowing variation of aerofoil geometry which is cost-effective.

In a first aspect a wind turbine blade is provided. The blade comprises one or more deformable trailing edge (DTE) sections. Each deformable trailing edge section comprises a first and a second actuator. The second actuator is arranged substantially downstream (in a chordwise direction) of the first actuator. The first actuator is of a first type and the second actuator is of a second type, the second type being different from the first type.

Throughout the description and claims, the term "deformable trailing edge (DTE)" is used for the portion of the blade (viewed in a chordwise direction) that spans approximately from the structural portion of the blade, for example the spar, to the trailing edge. A deformable trailing edge section may or may not include a hinged flap, such as e.g. a split flap, a slotted flap, a Fowler flap or a spoiler. Alternatively, the deformable trailing edge section may be a substantially Continuous Deformable Trailing Edge (CDTE) section.

According to this aspect, by providing two actuators of a different type inside a blade's deformable trailing edge section, an aerodynamic surface of the blade can be widely varied. As the actuators are of a different type, they have a different application range and as they are arranged substantially downstream, they may be considered as arranged "in series" along the chord line of the blade. Actuation of the first actuator affects the second one. Depending on circumstances, either one of the actuators or both actuators may be used to adapt to instantaneous conditions, whichever is more appropriate in terms of e.g. reaction speed, energy consumption, or range. Furthermore, this may be achieved without excessively complicating a wind turbine blade structure.

Or put another way, the provision of two different actuators having different application ranges increases performance of the rotor as the loads acting on the blades can be dealt with at different levels or depending on the nature of the loads. Therefore loads derived from different phenomena such as for example wind gusts (sudden change in wind speed/direction), a blade passing in front of the tower, wind shear, situations of "layered winds" or wind veer can be tackled at different moments in time in a rather cost-effective manner with a blade substantially as hereinbefore described.

The first actuator may be arranged closer to a structural portion of the blade and the second actuator may be arranged closer to a trailing edge of the blade. They may thus be considered to be arranged "in series". In this sense, "structural portion" is to be understood as a portion or component of the wind turbine blade that has as a main function to withstand and transmit loads and is relatively strong/stiff compared to other parts of the blade.

The structural portion of the blade may typically include a spar such as for example, an I beam spar, a spar box or a C-shape spar. A spar is typically provided in wind turbine blades to maintain the blade shape and it supports and transmits loads on the blades, and in particular the blade bending loads.

In some embodiments, the second type may be different from the first type in reaction speed. This way, for example, an actuator having a faster reaction speed such as for example a substantially short piezoelectric element (able to actuate a short DTE) may be used when an abrupt change in the wind conditions (sudden wind gusts, turbulence and/or a blade passing in front of a wind turbine tower) is detected. And when a substantially long term change in the wind conditions has occurred that remains fairly stable for a relatively long period of time (in the range of minutes to hours) an actuator having a slower reaction speed may be used to compensate such long term or average loads. Examples may be slight modifications on the average wind speed of homogenous wind fields, wind veer, wind shear and/or situations of layered winds.

In some embodiments, the second type may be different from the first type in energy consumption. By using a low consumption actuator at least for example for changing the aerofoil geometry as a consequence of average wind conditions, a cost-effective solution, at least in terms of energy consumption, is obtained.

In some embodiments, the deformable trailing edge section may be provided at or near a tip of the blade. Optionally, the deformable trailing edge section may extend along approximately one third of the total length of the blade, particularly the outer third of the blade. The outer third of the blade is generally regarded as the part of the blade that has most effect on the torque of the wind turbine rotor. This is because the shape in that section of the blade is optimized in terms of its aerodynamic efficiency (contrary to e.g. the most inward section of the blade which is optimized more to support loads). Additionally, the outer section of the blade has the longest "lever arm" with respect to the rotor axis.

In some cases, the deformable trailing edge section may span between 50% and 75% of the chord line of the blade section to the trailing edge. In other cases, the deformable trailing edge section may extend from e.g. 25%, 30% or 40% of the chord to e.g. 100% of the chord, i.e. the trailing edge.

Depending on circumstances the length of the deformable trailing edge section may be varied in the spanwise and chordwise directions respectively.

Another aspect provides a wind turbine comprising one or more blades substantially as hereinbefore described.

A further aspect provides a method of operating a wind turbine substantially as hereinbefore described. The method may comprise substantially continuously determining one or more wind turbine operation conditions indicative of one or more future loads on the blades of the wind turbine, and determining, for each of the one or more future loads, a lift correction demand to adapt to the future load. Then, for each of the lift correction demands, a maximum lift correction that can be provided by the first actuator may be determined, as well as a remaining lift correction defined as the lift correction demand minus the maximum lift correction; Then the method includes actuating the first actuator to provide the maximum lift corrections and actuating the second actuator to provide the remaining lift corrections.

In this aspect, a method of control of a wind turbine blade is provided wherein a first actuator that has relatively low energy consumption (but may be slow to react) can be used for adapting the blade to most wind conditions and loads that it may encounter. A second actuator that is faster to react may be used to adapt to loads and conditions that occur too quickly for the first actuator.

A still further aspect provides a further method of operating a wind turbine substantially as hereinbefore described. Instead of determining, for each lift correction demand, a maximum lift correction that can be provided by the first actuator, this further method may comprise determining from the lift correction demands an average lift correction and determining a remaining lift correction defined as the lift correction demand minus the average lift correction. The method then includes actuating the first actuator to provide the average lift correction and actuating the second actuator to provide the remaining lift correction.

In this aspect, it may be ensured that the use of the second actuator oscillates around its neutral or "zero" position. The neutral position for most actuator types will require very little or no energy. By having the second actuator substantially oscillate around this neutral position, it may be achieved that energy consumption of the second actuator may be minimized.

In some cases substantially continuously determining one or more wind turbine operation conditions may comprise measuring loads (blade loads and/or blade root loads) and/or wind conditions. For instance, a LIDAR system may be used to characterize wind conditions to further control the different actuators in the DTE.

Additional objects, advantages and features of embodiments of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1:
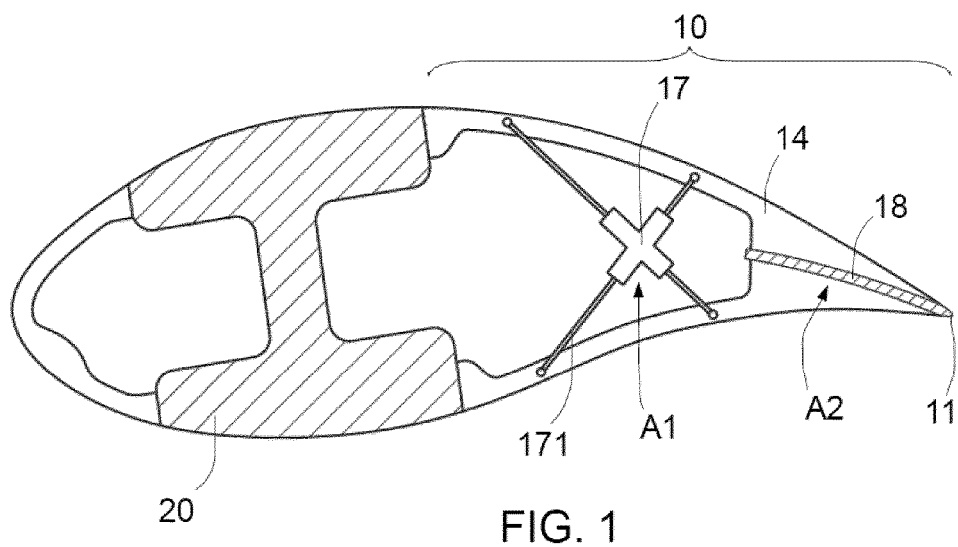
FIG. 1 shows a cross-sectional view of a wind turbine blade according to a first embodiment.

FIG. 1 shows a cross-sectional view of a wind turbine blade. The blade may comprise a deformable trailing edge (DTE) section 10, and in particular a Continuous Deformable Trailing Edge (CDTE) section. The DTE 10 may extend from the spar 20 to the trailing edge 11 of the blade. Inside the DTE, two actuators A1 and A2 may be arranged in series in a chordwise direction. One actuator may be arranged substantially downstream from the other. A first actuator A1 may be arranged closer to a blade spar 20 than a second actuator A2 that may be arranged closer to a blade trailing edge 11.

The first actuator A1 may be of a first type which may be different from the second actuator A2. In some cases, actuator A1 may be different from actuator A2 in reaction speed. In others they may be different in energy consumption. In an example, the second actuator A2 may have faster reaction speed than the first actuator A1.

At least portions of the blade skin 14 of the DTE may be made of a relatively flexible material. In some cases even substantially the whole blade skin may be made of a relatively flexible material. This ensures deformability and smoothness of the blade surface upon changing any of the actuators. Elastic or elastomeric materials are example of materials that can confer relatively high flexibility so that cracks due to fatigue loads are reduced.

In the example shown in FIG. 1, the first actuator A1 may be a pneumatic system 17 actuating on a substantially long DTE portion and the second actuator A2 may be a piezoelectric element 18 actuating on a substantially short DTE portion. These actuators are different in reaction speed and/or energy consumption. A pneumatic system has a lower consume of energy than a piezoelectric element. The pneumatic system 17 may be linked to an inner side of the blade skin 14 by rigid links 171. The piezoelectric element 18 may be embedded in the portion of the blade skin 14 closer to the trailing edge 11. This way, and as the blade skin may be made of a relatively flexible material, actuation of any of the pneumatic system 17 and the piezoelectric element 18 can change an outer shape of the blade.

It should be understood that the rigid links 171 may be structural elements, e.g. beams, having a sufficient stiffness such as not to deform, in particular under the influence of the actuators.

According to this, the pneumatic system 17 may provide a first deformation of the blade outer shape in response to, for example, average loads acting on the blade at a first moment in time. Actually, average loads acting on the blade may be measured at time intervals which may be predefined or not. Optionally, the time intervals may be constant. Each time average loads are measured, the first actuator A1 (pneumatic system in the example of FIG. 1) may be actuated to adapt to such loads. Whenever an abrupt change in the wind conditions is detected, the second actuator A2 (the piezoelectric element 18 in the example of FIG. 1) may be actuated to compensate for such abrupt change. As the output of the actuation of any of the first and second actuator A1, A2 is a change in the outer shape of the blade, actuation of the first actuator A1 influences actuation of the second actuator A2. In fact, depending on circumstances there may be situations in which part of the abrupt change in the wind conditions may already be absorbed by the blade shape change derived from acting the first actuator A1. In these cases, actuation of the second actuator A2 may be minimized, i.e. energy consumption may at least partially be reduced.

In general terms, an actuator that establishes a change in the shape of the blade affects mainly the whole portion of the blade downstream from the actuator.

A further case may be that in which at time intervals average loads acting on each blade are determined and a first actuator A1 of each blade is actuated to compensate for such average loads. As the blades rotate, they are passing in front of the wind turbine tower in a regular basis. Since a control system may easily be configured to determine when each blade is going to pass in front of the wind turbine tower, it is also possible to activate the second actuator A2 in order to compensate for the load changes due to passing in front of the wind turbine tower. In order to react adequately, the second actuator may have a relatively high reaction speed.

In general, wind conditions such as wind shear, wind veer and/or situations of layered winds are wind conditions that normally last some time and are normally not too abrupt. They can thus be tackled with an actuator having a substantially slow reaction speed and are more particularly tackled by actuators with a relatively low energy consumption. Other wind conditions may comprise wind gusts, turbulence or a blade passing in front of a wind turbine tower are situations changing wind conditions and require an instant or relatively quick response. These situations may thus be tackled with an actuator having a faster reaction speed.

In alternative embodiments, the pneumatic system may be replaced by a magnetorheological element actuating on a substantially long DTE portion.

Figure 2:
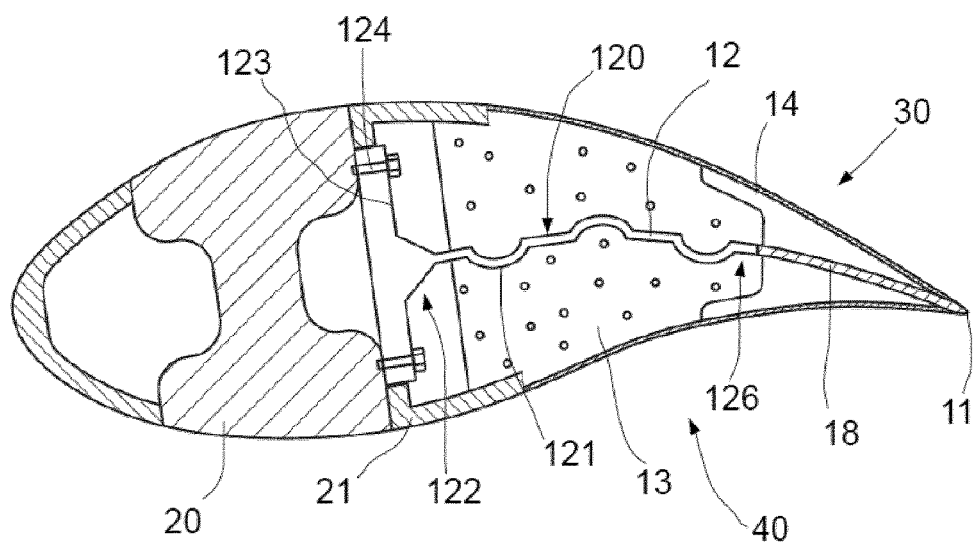
FIG. 2 shows a cross-sectional view of a wind turbine blade according to a second embodiment.

The example shown in FIG. 2 differs from the example shown in FIG. 1 in that the pneumatic system has been replaced by a multistable element such as a dimpled sheet 12 having a surface 120. A plurality of dimples 121 may be provided along the sheet surface 120.

The dimples 121 may be provided with their convex side pointing towards either a suction side 30 or a pressure side 40 of the blade. Any of these positions are stable positions for the dimples. In this sense, a stable position means that no energy or force is necessary to maintain the dimples in these positions. In fact, a certain amount of force/energy above a threshold value would be necessary to change the dimple to another position. The dimples are thus stable in two states without continued actuation and a dimpled sheet can be stable in a plurality of deformed positions depending on the stable state selected for each dimple. A dimpled sheet can thus be considered as an example of a multistable structure.

The dimpled sheet 12 may be attached in a cantilever manner to the blade spar 20 and may extend in a chordwise direction towards the trailing edge 11 of the blade up to the second actuator which in the example of FIG. 2 is equal to the second actuator of the example shown in FIG. 1, i.e. a piezoelectric element 18. The dimpled sheet in this case may extend from approximately 40% of the chord to approximately 75% of the chord and the outer 25% of the chord line corresponds to the piezoelectric element 18. Variations in length and exact position are possible.

An end 122 of the dimpled sheet may thus be adapted to be attached to the blade spar 20 in a cantilever manner. The attachment to the blade spar 20 may be done in any known manner such as for example providing a transverse plate 123 at the end 122 of the dimpled sheet and screwing the transverse plate 123 directly to the spar 20 with bolts 124. The attachment of the spar may vary depending on the type of spar used. The other end 126 of the dimpled sheet may be adapted to be fixed to the second actuator, i.e. the piezoelectric element 18 that may be embedded in the portion of the blade skin 14 closer to the trailing edge 11 or alternatively e.g. in a relatively flexible material (e.g. foam or suitable honeycomb) attached to the skin, as depicted in FIG. 2.

An inside portion of the DTE that houses the dimpled sheet may be filled with e.g. a foam 13 provided from the dimpled sheet 12 to the blade skin 14. The foam may thus connect the dimpled sheet 12 with the blade skin 14. In alternatives embodiments, other ways of connecting the dimpled sheet with the blade skin may be foreseen, for example anisotropic material, a honeycomb structure or even one or more substantially rigid bars. A honeycomb structure is a relatively lightweight material that if designed properly can display a desirable anisotropic behavior: it may be made to be relatively stiff in a direction substantially perpendicular to the chord line direction, i.e. it is stiff so as to maintain the aerofoil thickness and not deform under aerodynamic pressure. At the same time, it may be made to be more flexible in a direction substantially parallel to the chord line, thus allowing proper movement of the dimpled sheet. In other implementations, instead of a honeycomb structure material, other kinds of lightweight materials having such anisotropic properties so as to permit an internal structural behavior may also be used.

Actuating a dimpled sheet means that one or more dimples are changed from one stable state to the other stable state, the dimpled sheet changes its outer shape in an effective manner. Such a change in the outer shape of the dimpled sheet may further be transferred to the blade skin thanks to the foam provided inside the DTE. In alternative embodiments, other ways of connecting the dimpled sheet to the blade skin such as rigid bars or similar may also be foreseen.

By switching between the stable positions of one or more dimples, the tension applied to the portions of the sheet between the dimples changes and therewith the curvature of the sheet. A change in the curvature of the sheet is transmitted through the foam to the blade skin thus deforming the outer shape of the blade.

A further rigid structure 21 may also be provided substantially tangential to an inner surface of a pressure side 40 of the blade skin and substantially tangential to an inner surface of a suction side 30 of the blade skin for supporting the blade skin. Alternatively, the local portion of the skin may be relatively stiff compared to the more deformable/flexible portion of the skin downstream thereof.

A dimpled sheet substantially as hereinbefore described may be provided with a plurality of dimples distributed in a matrix configuration along the sheet surface. In other cases, the dimples may be distributed in a single line or describing circular paths. Other distributions may also be foreseen.

A matrix configuration of dimples (bistable elements) gives rise to a wide variety of blade shape configurations depending on the dimples that have been activated. As the dimples change position, the tension applied by the dimples to the sheet changes both in the chordwise and the spanwise direction. A twist of blade sections and also the curvature (camber line) may also be achieved.

Thus, using a dimpled sheet substantially as hereinbefore described a large number of combinations of "flap angle" and/or chord length of the blade may be available to adjust lift (and drag and pitch moment) to adapt to wind conditions that remain fairly stable for a relatively long period of time (in the range of minutes to hours) and their corresponding loads.

In some embodiments, the dimples are or comprise piezoelectric elements. In some cases, a multiplexer connectable to a power supply and adapted to supply energy to the dimples may further be provided. In these cases power supply may be provided e.g. in the blade root portion or in the hub and information from a controller may inform the multiplexer which dimple has to be activated.

Other embodiments may use a pneumatic or oil-hydraulic system with actuators adapted to change the dimples from one stable position to the other stable position.

In some cases, one or more dimples may further comprise a force multiplying system. This may be of special interest in those cases activating the dimples by a pneumatic system as these systems sometimes may not provide enough force for changing the dimples from one stable position to the other stable position. The force multiplying system may comprise a lever mechanism, an inherent asymmetry in the dimples, a force/energy accumulator.

The spar shown in FIGS. 1 and 2 may be an I-beam spar. In alternative embodiments, other known structural parts of the blade may be provided such as for example, a spar box or a C-shape spar. The spar 20 may be provided to maintain the distance between an inner surface of a suction side 30 of the blade and an inner surface of a pressure side 40 of the blade. The spar 20 may support and transmit wind loads acting on the blades, and in particular the blade bending loads.

In some cases, a blade substantially as hereinbefore described may further be provided with a control system for controlling the actuators. In others, the control system may be provided in other parts of the wind turbine. In the examples comprising piezoelectrical elements the control system may apply an electrical field on the piezoelectric elements so as to generate a mechanical strain (deformation) on the blade skin surface on which the actuators are being mounted. Based on the reverse piezoelectric effect, each actuator converts the input signal received from the control system into an internal mechanical deformation of the piezoelectric element thus deforming the surface of the blade on which it is mounted.

The deformable trailing edge may extend on the total length of the blade or it may extend on at least one section of the blade, e.g. on substantially one third of the total length, in particular the portion closest to the tip of the blade. In other cases, a plurality of deformable trailing edge sections may also be provided.

Regardless the fact that only some examples have been described, it should be understood that the actuators may be selected among the group consisting of piezoelectric elements, magnetorheological elements, bistable elements, multistable elements and pneumatic or hydraulic actuators. Some specific examples include a first actuator of the group of bistables, multistables, magnetorheological elements and "internal" pneumatic or hydraulic actuators, and a second actuator of the group of piezoelectric elements, and hydraulic or pneumatic activated hinges.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

What is claimed is:

1. A wind turbine blade comprising:
   a deformable trailing edge section comprising a first actuator and a second actuator,
   wherein the first actuator comprises a multistable sheet comprising a plurality of preformed bistable elements, each bistable element having two stable positions, wherein the multistable sheet is connected to a skin of the deformable trailing edge section such that upon changing one or more preformed bistable elements of the plurality of preformed bistable elements from one of the two stable positions to the other of the two stable positions, a shape of the deformable trailing edge section changes, wherein the preformed bistable elements are dimples, each dimple having a first stable position protruding from one side of the multistable sheet and a second stable position protruding from the other side of the multistable sheet,
   wherein the second actuator is arranged substantially downstream from the first actuator along a chord line of the wind turbine blade, and
   wherein the first actuator is of a first type and wherein the second actuator is of a second type, the second type being different from the first type.

2. The wind turbine blade according to claim 1, wherein the second type is different from the first type in reaction speed.

3. The wind turbine blade according to claim 1, wherein an energy consumption of the second type is different from an energy consumption of the first type.

4. The wind turbine blade according to claim 2, wherein the energy consumption of the first type is lower than the energy consumption of the second type.

5. The wind turbine blade according to claim 4, wherein the second type is faster than the first type.

6. The wind turbine according to claim 1, wherein the second actuator is selected among a group consisting of a piezoelectric element, and a hydraulic or pneumatic activated flap or spoiler.

7. The wind turbine blade according to claim 1, wherein the deformable trailing edge section is provided at or near a tip of the wind turbine blade.

8. The wind turbine blade according to claim 1, wherein the deformable trailing edge section extends along approximately one third of the total length of the wind turbine blade.

9. The wind turbine blade according to claim 1, wherein the deformable trailing edge section spans from between 50% and 75% of the chord line of a blade section to a trailing edge of the wind turbine blade.

10. The wind turbine blade according to claim 1, wherein the skin of the deformable trailing edge section or at least portions of the skin of the blade trailing edge section are made of a flexible material.

11. A wind turbine comprising one or more wind turbine blades according to claim 1.

12. A method of operating a wind turbine comprising at least a wind turbine blade comprising one or more deformable trailing edge sections, each deformable trailing edge section comprising a first actuator and a second actuator, wherein the second actuator is arranged substantially downstream from the first actuator, and wherein the first actuator is of a first type and wherein the second actuator is of a second type, the second type being different from the first type, the method comprising:

substantially continuously determining one or more wind turbine operation conditions indicative of one or more future loads on the blades of the wind turbine, determining, for each of the one or more future loads, a lift correction demand to adapt to the future load, determining, for each of the lift correction demands, a maximum lift correction that can be provided by the first actuator, and a remaining lift correction, wherein remaining lift correction=lift correction demand−maximum lift correction; and actuating the first actuator to provide the maximum lift corrections and actuating the second actuator to provide the remaining lift corrections.

13. A method of operating a wind turbine comprising at least a wind turbine blade comprising one or more deformable trailing edge sections, each deformable trailing edge section comprising a first actuator and a second actuator, wherein the second actuator is arranged substantially downstream from the first actuator, and wherein the first actuator is of a first type and wherein the second actuator is of a second type, the second type being different from the first type, the method comprising:

substantially continuously determining one or more wind turbine operation conditions indicative of a plurality of future loads on the blades of the wind turbine, determining, for each of the plurality of future loads, a lift correction demand to adapt to the future load, determining from the lift correction demands an average lift correction, and determining for each of the lift corrections, a remaining lift correction, wherein remaining lift correction=lift correction demand−average lift correction; and actuating the first actuator to provide the average lift correction and actuating the second actuator to provide the remaining lift correction.

* * * * *